United States Patent
Sakaida et al.

(10) Patent No.: US 9,942,477 B2
(45) Date of Patent: Apr. 10, 2018

(54) IMAGE PROCESSING APPARATUS AND METHOD

(71) Applicant: CANON KABUSHIKI KAISHA, Tokyo (JP)

(72) Inventors: Minoru Sakaida, Kawasaki (JP); Tomotaka Uekusa, Yokohama (JP); Hiroyuki Yaguchi, Ichikawa (JP); Soichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 15/279,685

(22) Filed: Sep. 29, 2016

(65) Prior Publication Data
US 2017/0099438 A1    Apr. 6, 2017

(30) Foreign Application Priority Data
Oct. 5, 2015   (JP) .................. 2015-197965

(51) Int. Cl.
H04N 5/232    (2006.01)

(52) U.S. Cl.
CPC ................ *H04N 5/23254* (2013.01)

(58) Field of Classification Search
CPC ........ H04N 5/23251; H04N 5/23267; H04N 5/2327; H04N 7/014; H04N 7/0157; H04N 19/51; H04N 19/137; H04N 19/139; H04N 19/513; H04N 19/521; H04N 19/527; H04N 19/56; G06T 7/20; G02B 27/646; G03B 2205/0007
USPC ................................... 348/208.99
See application file for complete search history.

(56) References Cited

U.S. PATENT DOCUMENTS

| | | | | |
|---|---|---|---|---|
| 6,192,156 B1 * | 2/2001 | Moorby | ............... | G06K 9/32 348/169 |
| 6,728,394 B1 * | 4/2004 | Chen | ............... | G06T 7/246 128/915 |
| 7,095,786 B1 * | 8/2006 | Schonfeld | ............... | H04N 19/51 375/240.16 |
| 8,274,570 B2 * | 9/2012 | Handa | ............... | H04N 5/23248 348/208.3 |
| 8,831,105 B2 * | 9/2014 | Lee | ............... | H04N 19/52 375/240.16 |
| 8,849,054 B2 * | 9/2014 | Liu | ............... | H04N 5/145 348/208.4 |

(Continued)

FOREIGN PATENT DOCUMENTS

JP    2008-192060 A    8/2008

*Primary Examiner* — Pritham Prabhakher
(74) *Attorney, Agent, or Firm* — Cowan, Liebowitz & Latman, P.C.

(57) ABSTRACT

An image processing apparatus comprises: a dividing unit that divides two frame images into a plurality of divided areas; a determination unit that determines a representative point for each of the divided areas in one of the two frame images; a setting unit that, for each of the two frame images, sets image portions for detecting movement between the two frame images, based on the representative points; and a detection unit that detects movement between the two frame images based on correlation values of image signals in the set image portions, wherein for each of the divided areas, the determination unit determines a feature point of the divided area or a predetermined fixed point as the representative point of the divided area in accordance with a position of the divided area in the one frame image.

19 Claims, 13 Drawing Sheets

(56) References Cited

U.S. PATENT DOCUMENTS

| | | | | |
|---|---|---|---|---|
| 9,691,158 | B1* | 6/2017 | Feldman | G06T 7/20 |
| 9,794,588 | B2* | 10/2017 | Dong | H04N 19/573 |
| 2003/0219147 | A1* | 11/2003 | Nishiura | G06T 7/20 |
| | | | | 382/103 |
| 2004/0120548 | A1* | 6/2004 | Qian | G06T 7/246 |
| | | | | 382/103 |
| 2007/0195172 | A1* | 8/2007 | Kurata | H04N 5/144 |
| | | | | 348/208.99 |
| 2008/0107307 | A1* | 5/2008 | Altherr | H04N 5/23248 |
| | | | | 382/107 |
| 2017/0094310 | A1* | 3/2017 | Dong | H04N 19/521 |

\* cited by examiner

IMAGE PROCESSING APPARATUS AND METHOD

BACKGROUND OF THE INVENTION

Field of the Invention

The present invention relates to an image processing apparatus and method, and more specifically relates to an image processing apparatus and method for detecting motion vectors.

Description of the Related Art

Conventionally, in order to perform image stabilization on a video captured using an imaging apparatus such as a digital still camera or a digital video camera, a moving amount between frame images is detected, and images are aligned by being shifted according to the detected moving amount. Methods for detecting the moving amount between frame images include a method of using information from an external device such as a gyrosensor and a method of estimating the moving amount from captured frame images.

Various proposals have been conventionally made for methods for estimating the moving amount with use of frame images, and a representative one of such methods is motion vector detection by template matching. In template matching, first, one of two captured frame images is set as the primary image, the other one is set as the reference image, and a rectangular area of a predetermined size in the primary image is set as a template block. Then the template block is shifted in the reference image, and a correlation is obtained between primary image pixel values in the template block and reference image pixels values in the template block at each of the shifted positions of the template block. At this time, the position at which the correlation is the highest in the reference image is the destination of the template block, and the direction to the destination and the movement amount that are based on the position of the template block in the primary image are used as the motion vector.

In order to improve the motion vector detection rate, there is a technique in which feature points are extracted, the template block is placed on an extracted feature point, and then template matching is performed between frame images. However, when feature point extraction is performed on an entire image, the distribution of feature points is often uneven, and if a motion vector obtained using uneven feature points is used in image stabilization, the image stabilization becomes focused on an area in which features are concentrated. Image stabilization is performed in order to correct a movement amount in the case where an image has moved by the same amount and in the same direction as a whole due to hand shake, but if the subject itself in the area with a concentration of feature points moves, and that movement is corrected as well, then it is not possible to perform appropriate image stabilization.

In view of this, Japanese Patent Laid-Open No. 2008-192060 discloses a technique in which, in order to distribute feature points evenly in an image, the image is divided into grid blocks, a feature value representing a feature magnitude is calculated for each pixel, and the pixel with the highest feature value in each grid block is extracted as a feature point. FIG. 13 is a diagram based on Japanese Patent Laid-Open No. 2008-192060 for describing a case in which a feature point is obtained for each grid block, template blocks are placed on the obtained feature points, and template matching is performed.

In FIG. 13, 1301 denotes an image, 1302 denotes grid blocks, 1303 denotes feature points in grid blocks, 1304 denotes templates, and 1305 denotes search ranges for templates. Two feature points are shown in this example, and therefore "−1" is added to the reference signs for the elements related to one of the feature points, and "−2" is added to the reference signs for the elements related to the other feature point. For example, in the grid block 1302-1, template matching is performed based on the template 1304-1 that is centered on the feature point 1303-1.

Real-time performance is required in the motion vector detection circuit used in a video camera or the like for image stabilization processing performed on a moving image. For this reason, the circuit is controlled such that, in the grid block 1302-1 for example, template matching processing for the grid block 1302-1 can be started immediately after the completion of image generation for template matching and feature point calculation processing for the grid block 1302-1.

However, as illustrated by the grid block 1302-2 at the lower edge of the image 1301, there are cases where when the feature point 1303-2 is in the bottom portion of the grid block 1302-2, the template 1304-2 and the search range 1305-2 protrude from the bottom of the grid block 1302-2. In such a case, pixel values in an area 1306 below the lower edge grid block 1302-2 are also needed in order to perform template matching. Accordingly, template matching processing cannot be started immediately after the completion of image generation of grid block 1302-2 for template matching and calculation processing for the feature point 1303-2. The start of matching processing becomes delayed until at least image generation for template matching has been completed for the area 1306 outside the grid block 1302-2.

Also, in consideration of the case where a template image and a search range protrude out from a grid block, pixel values need to be prepared in areas outside of grid blocks, and therefore the amount of data written to a memory increases.

SUMMARY OF THE INVENTION

The present invention has been made in consideration of the above situation, and achieves a speed increase in processing for motion vector detection by grid division and also a reduction in the data readout amount.

According to the present invention, provided is an image processing apparatus comprising: a dividing unit that divides each of two frame images into a plurality of divided areas; a determination unit that determines a representative point for each of the divided areas in one frame image out of the two frame images; a setting unit that, for each of the two frame images, sets image portions for detecting movement between the two frame images, based on the representative points; and a detection unit that detects movement between the two frame images based on correlation values of image signals in the set image portions in the two frame images, wherein for each of the divided areas, the determination unit determines a feature point of the divided area or a predetermined fixed point as the representative point of the divided area in accordance with a position of the divided area in the one frame image.

Further, according to the present invention, provided is an image processing apparatus comprising: a dividing unit that divides each of two frame images into a plurality of divided areas; a determination unit that determines a representative point for each of the divided areas in one frame image out of the two frame images; a setting unit that, for each of the two frame images, sets image portions for detecting movement between the two frame images, based on the representative points; and a detection unit that detects movement between the two frame images based on correlation values of image signals in the set image portions in the two frame images, wherein for each of the divided areas, the determination unit determines a feature point of the divided area or a predetermined fixed point as the representative point of the divided area in accordance with detection performance of the detection unit.

Furthermore, according to the present invention, provided is an image processing method comprising: dividing each of two frame images into a plurality of divided areas; determining a representative point for each of the divided areas in one frame image out of the two frame images; setting, for each of the two frame images, image portions for detecting movement between the two frame images, based on the representative points; and detecting movement between the two frame images based on correlation values of image signals in the set image portions in the two frame images, wherein in the determining, for each of the divided areas, a feature point of the divided area or a predetermined fixed point is determined as the representative point of the divided area in accordance with a position of the divided area in the one frame image.

Further, according to the present invention, provided is an image processing method comprising: dividing each of two frame images into a plurality of divided areas; determining a representative point for each of the divided areas in one frame image out of the two frame images; setting, for each of the two frame images, image portions for detecting movement between the two frame images, based on the representative points; and detecting movement between the two frame images based on correlation values of image signals in the set image portions in the two frame images, wherein in the determining, for each of the divided areas, a feature point of the divided area or a predetermined fixed point is determined as the representative point of the divided area in accordance with detection performance of the detection unit.

Further, according to the present invention, provided is a computer-readable storage medium storing a program for causing a computer to function as the units of the image processing apparatus that comprises: a dividing unit that divides each of two frame images into a plurality of divided areas; a determination unit that determines a representative point for each of the divided areas in one frame image out of the two frame images; a setting unit that, for each of the two frame images, sets image portions for detecting movement between the two frame images, based on the representative points; and a detection unit that detects movement between the two frame images based on correlation values of image signals in the set image portions in the two frame images, wherein for each of the divided areas, the determination unit determines a feature point of the divided area or a predetermined fixed point as the representative point of the divided area in accordance with a position of the divided area in the one frame image.

Further, according to the present invention, provided is a computer-readable storage medium storing a program for causing a computer to function as the units of the image processing apparatus that comprises: a dividing unit that divides each of two frame images into a plurality of divided areas; a determination unit that determines a representative point for each of the divided areas in one frame image out of the two frame images; a setting unit that, for each of the two frame images, sets image portions for detecting movement between the two frame images, based on the representative points; and a detection unit that detects movement between the two frame images based on correlation values of image signals in the set image portions in the two frame images, wherein for each of the divided areas, the determination unit determines a feature point of the divided area or a predetermined fixed point as the representative point of the divided area in accordance with detection performance of the detection unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
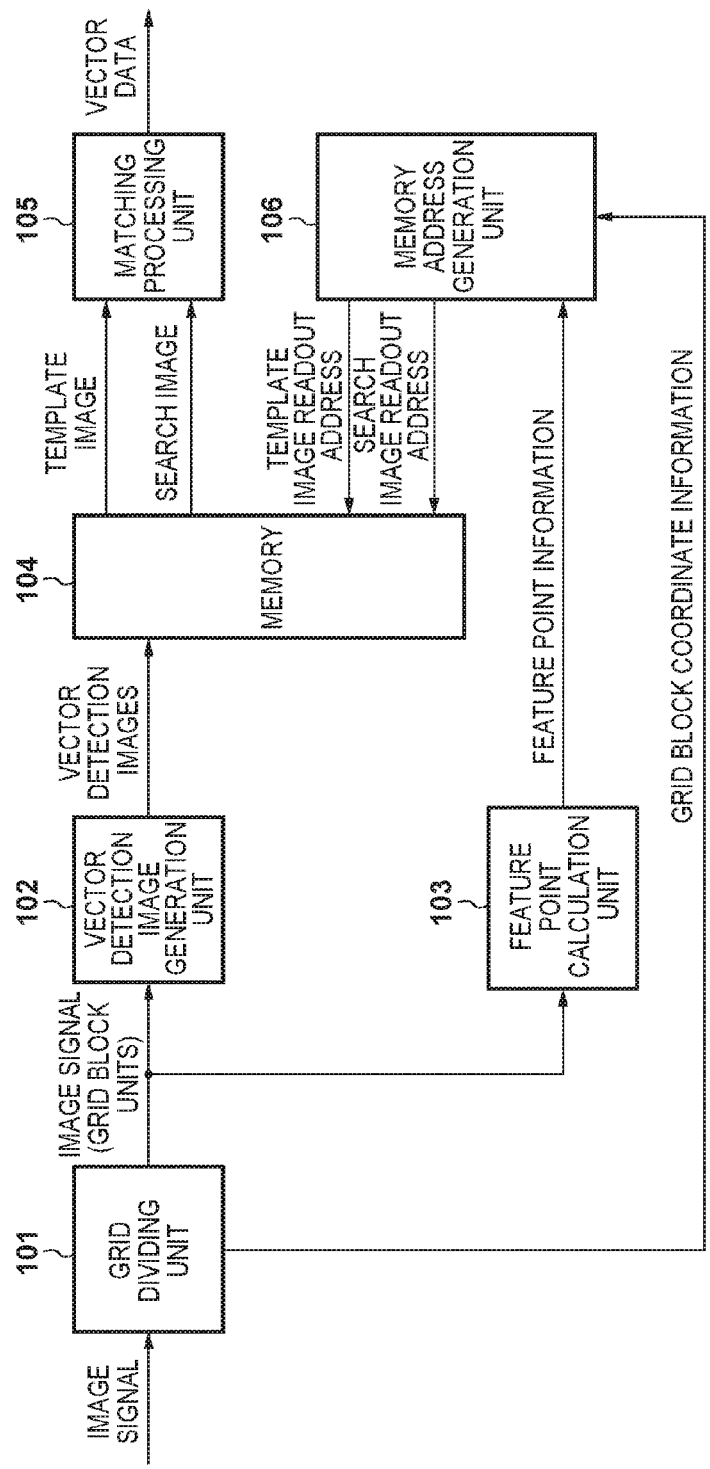
FIG. 1 is a block diagram showing a configuration of a motion vector detection circuit according to a first embodiment of the present invention.

FIG. 1 is a block diagram showing the configuration of a motion vector detection circuit that is used in an image processing apparatus according to a first embodiment of the present invention. A grid dividing unit 101 divides images into areas. A vector detection image generation unit 102 generates images for vector detection and stores them in a memory 104. A feature point calculation unit 103 calculates feature points using image signals. A memory address generation unit 106 changes the readout position from which a template image and a search image (image portions) are to be read out from vector detection images stored in the memory 104, in accordance with a feature point detection result. A matching processing unit 105 performs template matching on a template image and a search image that have been read out from the memory 104.

The following describes the flow of motion vector detection processing according to the first embodiment that is performed by the motion vector detection circuit having the above-described configuration.

First, the image signals of two consecutive frame images targeted for vector detection are successively input to the grid dividing unit 101. In the vector detection processing of the present embodiment, an image is divided into areas (referred to hereinafter as "grid blocks"), and a vector value is calculated for each of the grid blocks (divided areas).

Figure 2:
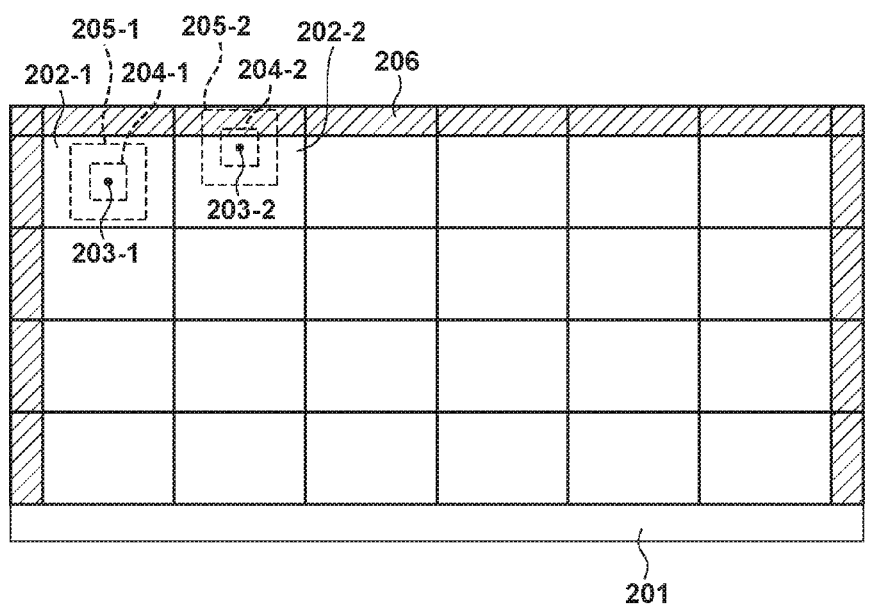
FIG. 2 is a diagram showing an example of image division according to the first embodiment.

FIG. 2 is a diagram showing an example in which an image is divided into grid blocks, and in this figure, an image 201 is divided into six portions horizontally and four portions vertically to obtain a total of 24 grid blocks 202. In the subsequent processing, first a feature point 203 is obtained for each grid block 202. Then, in accordance with the obtained feature points 203, a template image 204 is set in one of the two consecutive frame images, a search image 205 is set in the other frame image, and then template matching is performed. Note that in the following description, when specifying the grid blocks 202 and elements related to the respective grid blocks 202, the suffixes "-1" to "-24" are added to the reference signs of the grid blocks from the upper left grid block 202 to the lower right grid block 202, in ascending order from left to right and from top to bottom.

In the grid blocks divided as shown in FIG. 2, a feature point 203-2 has been detected in the vicinity of the edge of the grid block 202-2, and as a result, the template image 204-2 and the search image 205-2 protrude from the grid block 202-2. In this way, areas outside the grid blocks 202 (referred to hereinafter as "extra-grid areas") need to be prepared in order to calculate vector values for the grid blocks 202 that are at the upper, lower, left, and right edge portions of the image.

Figure 3:
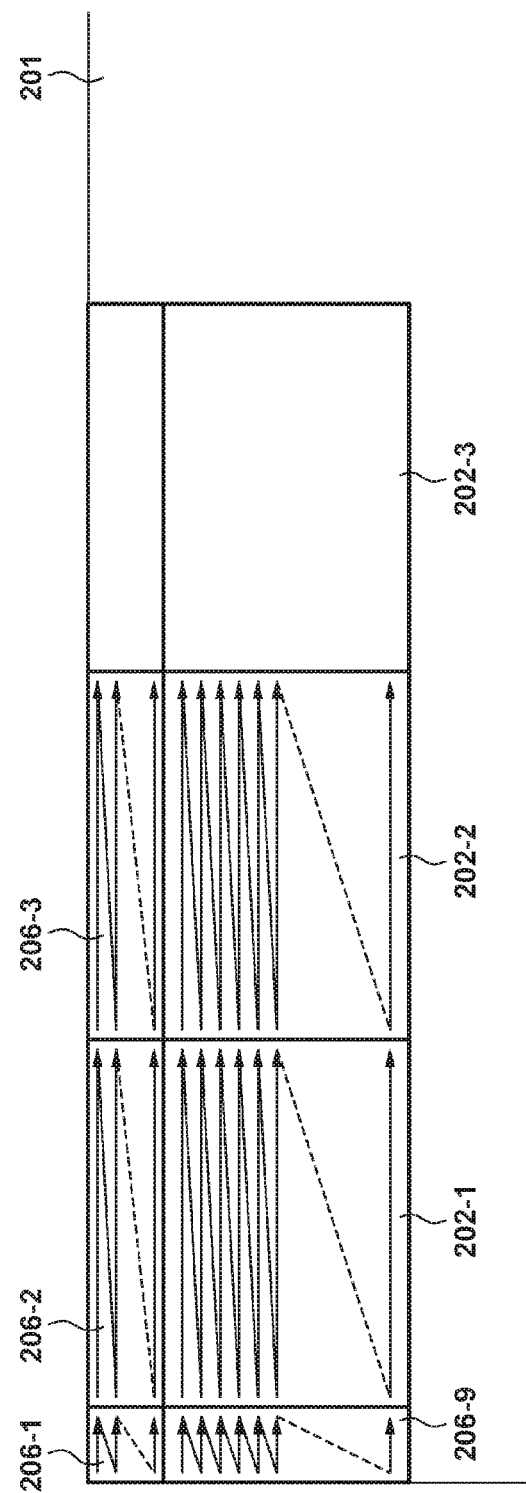
FIG. 3 is a diagram showing a processing sequence for a divided image according to the first embodiment.

Also, as shown in FIG. 3, the grid dividing unit 101 outputs image signals of the image 201 to the vector detection image generation unit 102 and the feature point calculation unit 103, which are at later-stages, for each divided area, including the aforementioned extra-grid areas 206.

First, image signals are read out from the extra-grid area 206-1 at the upper left edge, then image signals are read out from the extra-grid area 206-2 on the right side, and then from the extra-grid area 206-3, thus moving in the horizontal direction. When image signals have been read out from all of the extra-grid areas 206-1 to 8 at the upper edge, image signals are read out from the extra-grid area 206-9 on the left side of the grid block 202-1, and then image signals are read out from the grid block 202-1. When readout from the grid block 202-1 ends, image signals are read out from the grid block 202-2 and then the grid block 202-3, thus moving between the grid blocks 202-1 to 6 in the horizontal direction.

Note that the vector detection image generation unit 102 at a later stage needs to receive image signals from the extra-grid areas 206, but the feature point calculation unit 103 processes only the grid blocks 202 and thus does not need to receive image signals from the extra-grid areas 206. For example, a configuration is possible in which while image signals from the extra-grid areas 206 are being input to the vector detection image generation unit 102, power consumption is suppressed by stopping the clock signal supplied to the feature point calculation unit 103, for example.

Also, in the case where image signals of the image 201 are input to the grid dividing unit 101 in a raster scanning manner, raster block conversion processing employing a known technique needs to be performed in the grid dividing unit 101.

Next, image signals from the grid blocks are converted into vector detection images by the vector detection image generation unit 102 and then written to the memory 104. The vector detection image generation unit 102 is a band pass filter circuit, for example, and aims to eliminate a high frequency component and a low frequency component from the image signals that are not necessary for template matching processing.

Figure 4:
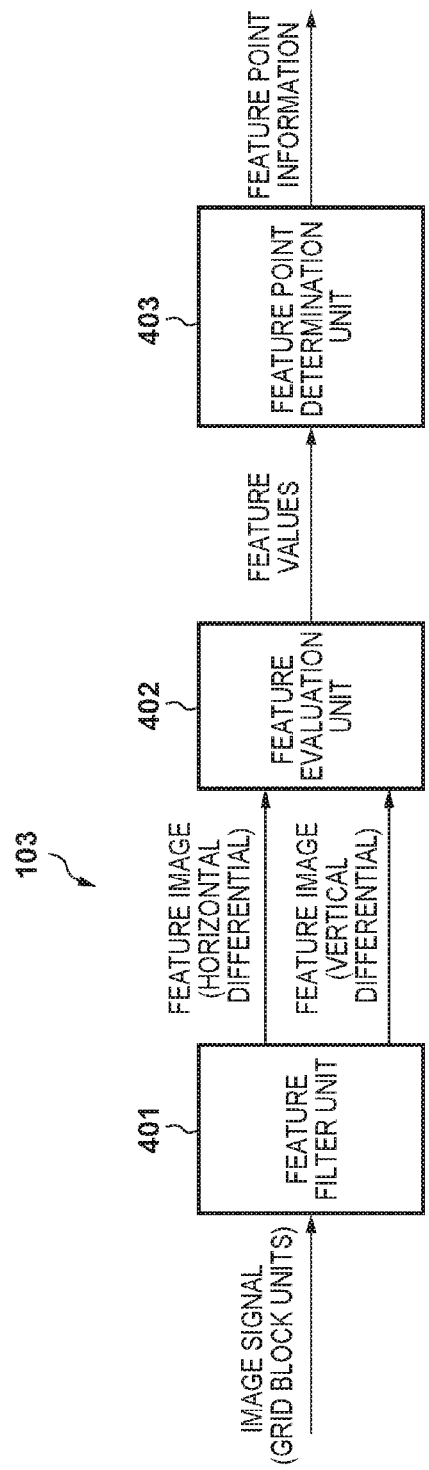
FIG. 4 is a block diagram showing a configuration of a feature point calculation unit according to the first embodiment.

Also, in parallel with the generation of the vector detection images, the feature point calculation unit 103 calculates feature points for the grid blocks. FIG. 4 is a block diagram showing the configuration of the feature point calculation unit 103, and this feature point calculation unit 103 is comprised of a feature filter unit 401, a feature evaluation unit 402, and a feature point determination unit 403.

The feature filter unit 401 is comprised of multiple filters, examples of which include a band pass filter, a horizontal differential filter, a vertical differential filter, and a smoothing filter. For example, the band pass filter is used to eliminate unnecessary high and low frequency components from the image signals, then horizontal differential filter processing and vertical differential filter processing are respectively applied to the image signals that are undergone the band pass filter processing, and then the signals resulting from such processing are subjected to smoothing filter processing and then output.

The feature evaluation unit 402 uses a feature calculation expression to calculate a feature value for each of the pixels in the grid blocks that has undergone the filter processing by the feature filter unit 401, that is to say calculates a point at which the differential values with the surrounding pixels are large in many directions, such as a pixel that is at an intersection between two edges or is on a curved line and is where the curvature takes the maximum value. In the first embodiment, a description will be given taking the example of the case of calculating feature values using the Shi and Tomasi technique.

First, an autocorrelation matrix H is created from the results of applying the horizontal differential filter and the vertical differential filter. Expression (1) below shows the expression for obtaining the autocorrelation matrix H.

$$H = G * \begin{pmatrix} Ix^2 & IxIy \\ IxIy & Iy^2 \end{pmatrix} \quad (1)$$

In Expression (1), Ix indicates the result of applying the horizontal differential filter, Iy indicates the result of applying the vertical differential filter, and the Gaussian filter G is convoluted. Expression (2) below shows the Shi and Tomasi feature evaluation expression.

$$\text{Shi and Tomasi} = \min(\lambda 1, \lambda 2) \quad (2)$$

Expression (2) shows that the smaller one of eigenvalues λ1 and λ2 in the autocorrelation matrix H of Expression (1) is taken as the feature value.

For each of the grid blocks, the feature point determination unit 403 determines as the feature point the pixel that has the largest feature value among the feature values calculated for the pixels by the feature evaluation unit 402. In the present embodiment, the coordinates of the feature point are expressed by relative coordinates (PX,PY) with respect to (0,0) as the upper left edge of each grid block, but they may be expressed by absolute coordinates in the image signal.

Note that the calculated feature points are stored in a memory or a register for each grid block in the feature point determination unit 403. When template matching processing is to be started for the corresponding grid block in the matching processing unit 105, feature point information is set in the memory address generation unit 106.

The memory 104 stores the vector detection images of two frames, namely the vector detection image being used at the current point in time and the vector detection image for one frame before that. In the present embodiment, the vector detection image for the current point in time is set as the template image, and the vector detection image for one frame before that is set as the search image when performing template matching.

The memory address generation unit 106 determines readout positions for the template image and the search image that will be necessary for template matching for a predetermined grid block, which are positions of readout from the two vector detection images stored in the memory 104, and then carries out memory access.

The following describes the determination of readout positions for the template image and the search image. In the present embodiment, control differs between (a) the case where the grid block targeted for vector detection is not at the lower edge and (b) the case where the grid block targeted for vector detection is at the lower edge. Note that information indicating whether or not the grid block targeted for vector detection is at the lower edge is determined by the grid dividing unit 101 based on grid block coordinate information that is input to the memory address generation unit 106. For example, in the case of the grid block layout shown in FIG. 2, if the vertical grid block coordinate at the upper edge is 0, then the vertical grid block coordinate at the lower edge is 3.

(a) Case where Grid Block Targeted for Vector Detection is not at Lower Edge

Figure 5:
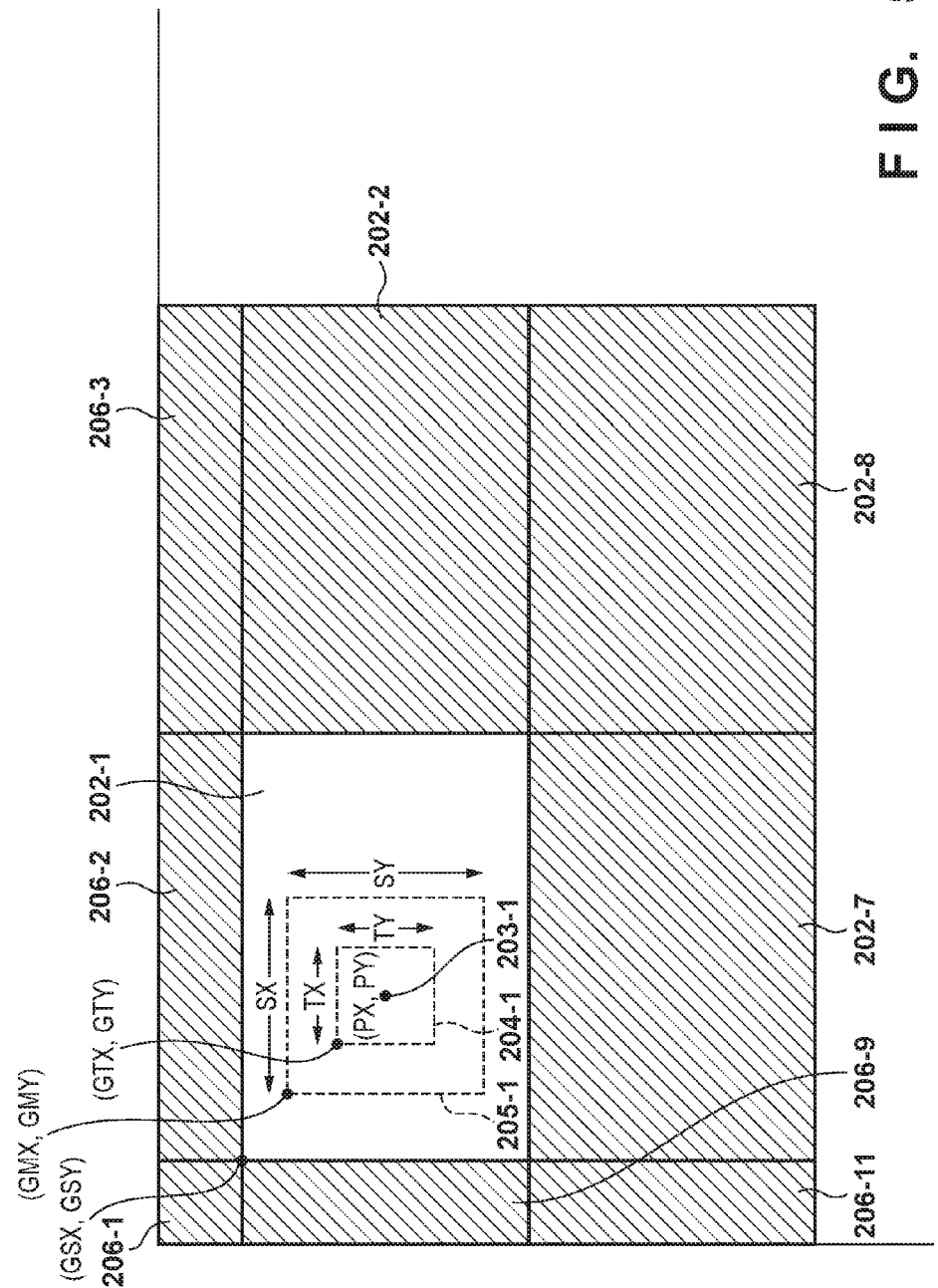
FIG. 5 is a diagram for describing a readout position in a vector detection image in a grid block that is not at the lower edge according to the first embodiment.

FIG. 5 shows the readout start position for the template image 204-1 and the readout start position for the search image 205-1 in the grid block 202-1. Note that in FIG. 5, elements that are the same as in FIG. 2 are denoted by the same reference signs, and the areas around the vector detection grid block that are to be used in template matching processing are indicated by hatching. Also, (GSX, GSY) indicates the start coordinates of the grid block in the image, and (PX, PY) indicates the coordinates of the feature point in the grid block. Also, (GTX, GTY) indicates the readout start coordinates of the template image 204-1 in the image, and (GMX, GMY) indicates the readout start coordinates of the search image 205-1 in the image.

First, using Expression (3) below, the coordinates (PX, PY) of the feature point in the grid block can be expressed by absolute coordinates (GPX, GPY) in the image with respect to (GSX, GSY) as the start coordinates of the grid block.

$$(GPX, GPY) = (GSX+PX, GSY+PY) \quad (3)$$

The template image 204-1 is placed such that the feature point 203-1 is at the center. Accordingly, the readout start position (GTX, GTY) for the template image 204-1 can be expressed by Expression (4) below, in which TX is the horizontal size of the template image 204-1, and TY is the vertical size of the same.

$$(GTX, GTY) = (GPX-(TX/2), GPY-(TY/2)) \quad (4)$$

The search image 205-1 is placed such that its center is aligned with the center of the template image 204-1. Accordingly, the readout start position (GMX, GMY) can be expressed by Expression (5) below, in which SX is the horizontal size of the search image 205-1, and SY is the vertical size of the same.

$$(GMX, GMY) = (GPX-(SX/2), GPY-(SY/2)) \quad (5)$$

The memory address generation unit 106 issues memory addresses such that a rectangular area (template image) with the horizontal size TX and the vertical size TY is read out from the vector detection image of the current frame, which is stored in the memory 104, beginning from the coordinates (GTX, GTY). Also, similarly, memory addresses are issued such that a rectangular area (search image) with the horizontal size SX and the vertical size SY is read out from the vector detection image from one frame before, which is stored in the memory 104, beginning from the coordinates (GMX, GMY).

At this time, in the case of performing template matching processing on the grid block 202-1, depending on the position (PX, PY) of the feature point 203-1, the template image 204-1 and the search image 205-1 may protrude from the grid block 202-1. In this case, image signals from the extra-grid areas 206-1 to 3, 9, and 11 and from the grid blocks 202-2, 202-7, and 202-8 are needed.

Figure 6:
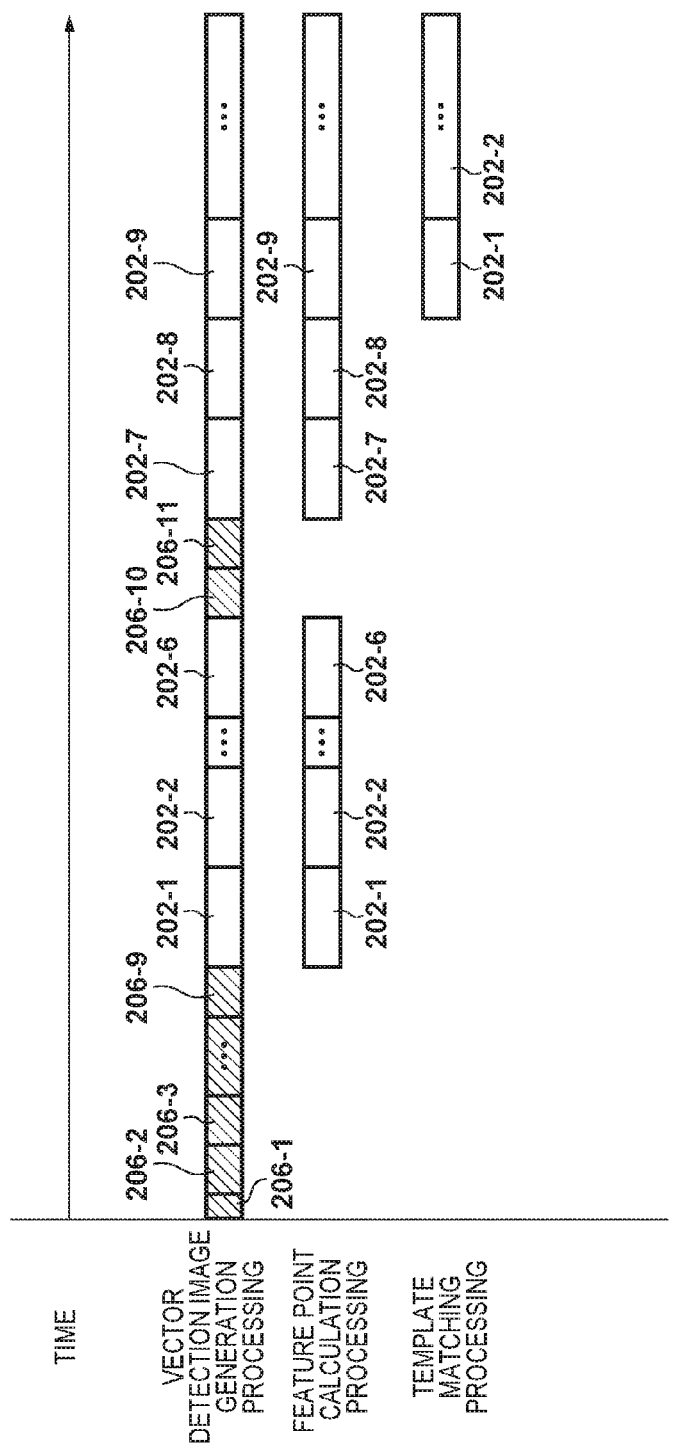
FIG. 6 is a diagram for describing vector detection processing timing in a grid block that is not at the lower edge according to the first embodiment.

FIG. 6 is a diagram illustrating processing timing in vector detection image generation processing, feature point calculation processing, and template matching processing, and also illustrating the times at which the extra-grid areas 206 and the grid blocks 202 are processed. In the present embodiment, in the case of performing template matching processing on the grid block 202-1, it is necessary to have completed vector detection image generation processing for images for the grid block 202-1 and the surrounding extra-grid areas and grid blocks, that is to say the grid blocks up to the grid block 202-8. Accordingly, processing on the grid block 202-1 starts at the time of completion of vector detection image generation processing for the grid blocks up to the grid block 202-8. Similarly, processing on the grid block 202-2 starts at the time of completion of vector detection image generation processing for the grid blocks up to the grid block 202-9, and template matching processing is performed at similar times thereafter.

(b) Case where Grid Block Targeted for Vector Detection is at Lower Edge

Figure 7:
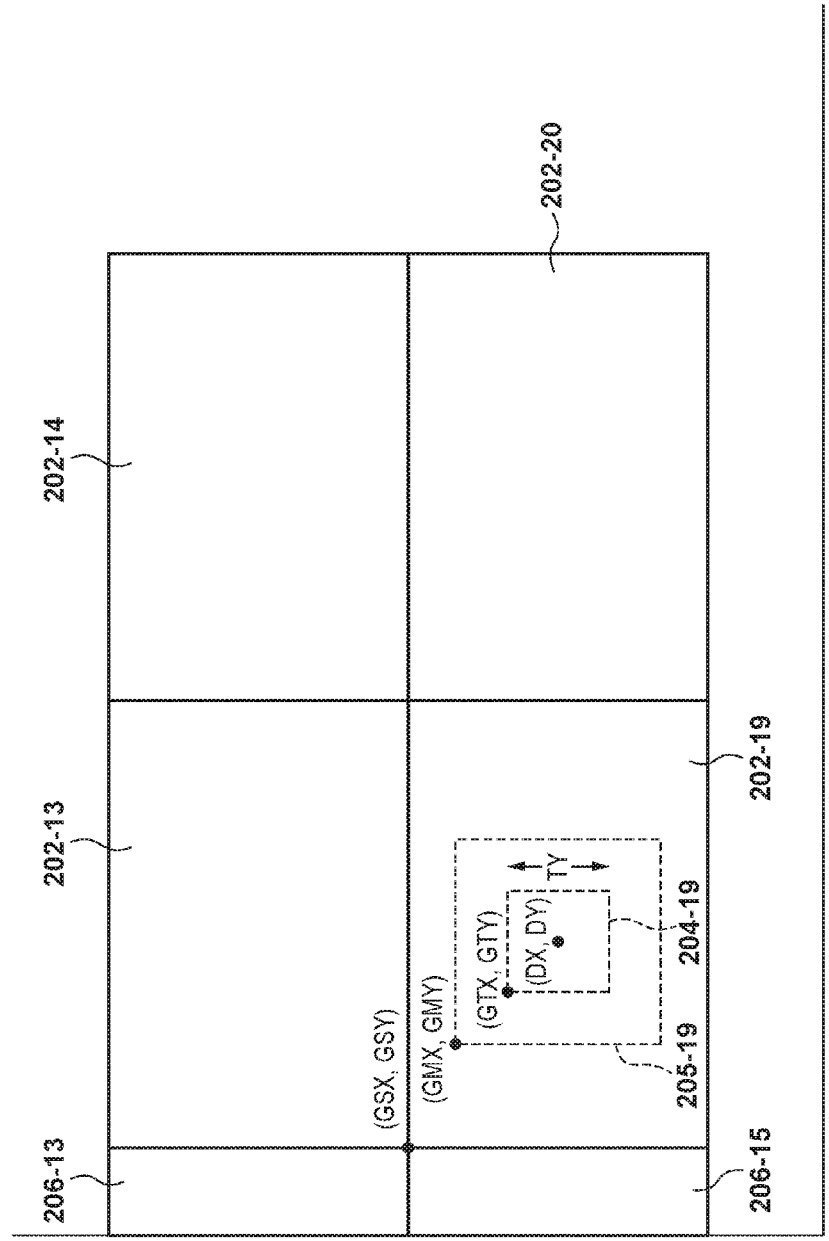
FIG. 7 is a diagram for describing a readout position in a vector detection image in a grid block that is at the lower edge according to the first embodiment.

FIG. 7 shows the readout start position of the template image 204-19 and the readout start position of the search image 205-19 in the grid block 202-19. Note that in FIG. 7, (DX, DY) indicates the center coordinates of the template image 204-19 in the grid block. Other elements are the same as those shown in FIG. 5 and therefore will not be described here.

In the grid block 202 at the lower edge, control is performed such that the template image 204-19 is placed at the center coordinates (DX, DY) of the grid block, rather than using the feature point 203 in the grid block. The center coordinate (DX, DY) is used in place of the feature point coordinates (PX, PY). Accordingly, letting (GSX, GSY) be the grid block start coordinates, GX be the horizontal size of the grid block 202-19, and GY be the vertical size, then the absolute coordinates (GPX, GPY) of the center coordinate (DX, DY) in the image can be expressed by Expressions (6) and (7) below.

$$(DX, DY) = (GX/2, GY/2) \quad (6)$$

$$(GPX, GPY) = (GSX+DX, GSY+DY) \quad (7)$$

The template image 204-19 is placed so as to be centered on the center coordinate (DX, DY). Accordingly, the readout start position (GTX, GTY) for the template image 204-19 can be expressed by above-described Expression (4), in which TX is the horizontal size of the template image 204-19, and TY is the vertical size of the same.

The search image 205-19 is placed such that its center is aligned with the center of the template image. Accordingly, the readout start position (GMX, GMY) can be expressed by above-described Expression (5), in which SX is the horizontal size of the search image 205-19, and SY is the vertical size of the same.

Similarly to (a) the case where the grid block targeted for vector detection is not at the lower edge, the memory address generation unit 106 issues memory addresses such that a rectangular area with the horizontal size TX and the vertical size TY is read out from the vector detection image of the current frame, which is stored in the memory 104, beginning from the coordinates (GTX, GTY). Also, similarly, memory addresses are issued such that a rectangular area with the horizontal size SX and the vertical size SY is read out from the vector detection image from one frame before, which is stored in the memory 104, beginning from the coordinates (GMX, GMY).

Figure 8:
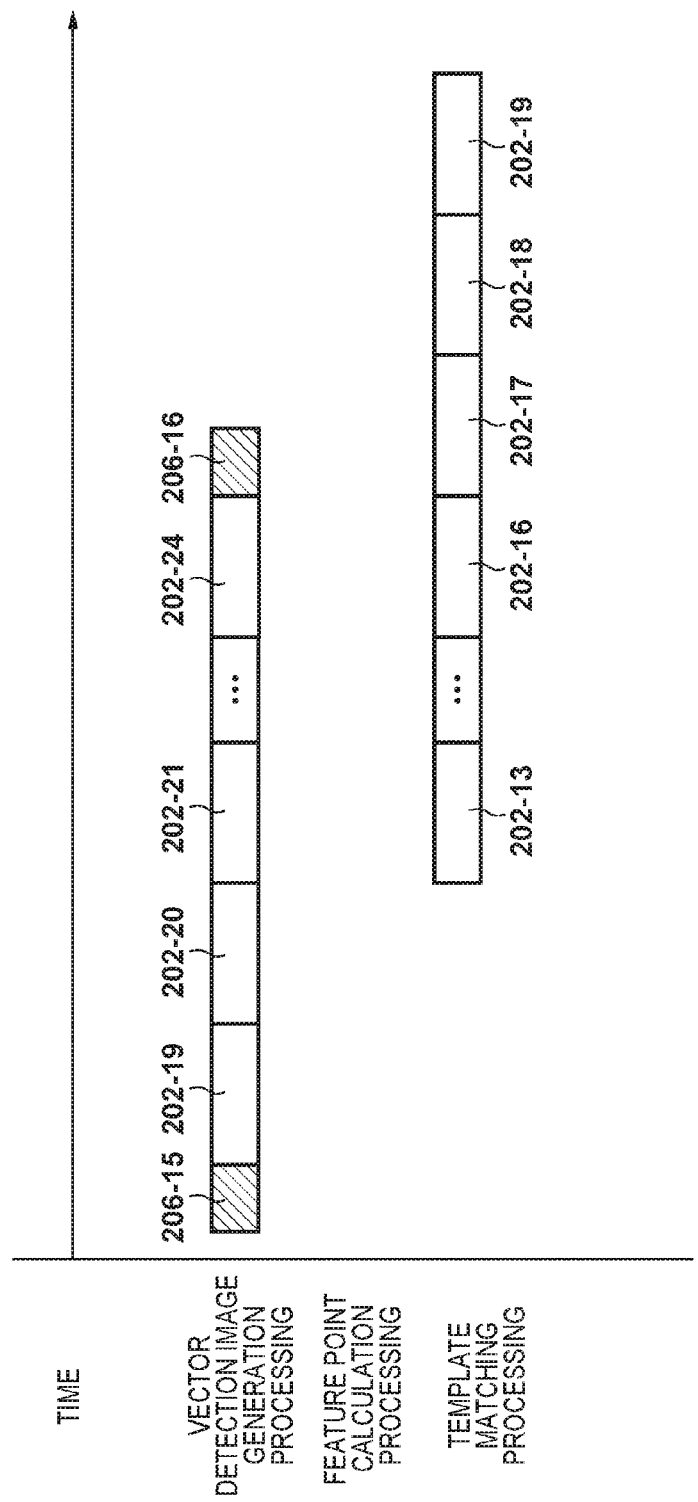
FIG. 8 is a diagram for describing vector detection processing timing in a grid block that is at the lower edge according to the first embodiment.

FIG. 8 is a diagram illustrating processing timing in vector detection image generation processing, feature point calculation processing, and template matching processing, and also illustrating the times at which the extra-grid areas 206 and the grid blocks 202 are processed.

In the case of performing template matching processing on the grid block 202-19, the template image 204-19 and the search image 205-19 do not protrude from the grid block 202-19, and therefore the extra-grid areas 206 are not needed. Accordingly, in the present embodiment, in the case of performing template matching processing on the grid block 202-19, processing can be started as long as vector detection image generation processing has been completed for the grid block 202-19, as shown in FIG. 7. For this reason, the processing of the grid block 202-19 at the lower edge can be started as soon as the processing of the grid blocks 202-13 to 18 in the immediately previous row has ended. Also, the extra-grid areas 206 are not needed for the grid blocks 202-19 to 24 at the lower edge, and therefore it is not necessary to perform vector image generation processing on image signals from the areas below the grid blocks 202-19 to 24 at the lower edge and write such images to the memory 104.

Note that it has been described in the first embodiment that in the grid blocks 202-19 to 24 at the lower edge, the template image 204 is placed at the center position of the grid block 202. However, the present invention is not limited in this way, and control may be performed such that the center of the template image 204 is placed at a fixed point at which neither the template image 204 nor the search image 205 protrude from the grid blocks 202 at the lower edge (i.e., both are completely contained within the divided area).

The matching processing unit 105 calculates correlation values using the template image 204 and the search image 205 that were read out from the memory 104 as described above, and calculates a vector value from the correlation values. For example, Sum of Absolute Difference (referred to hereinafter as "SAD") is used as the method for calculating the correlation values.

$$S\_SAD = \Sigma_i \Sigma_j |f(i,j) - g(i,j)| \quad (8)$$

In Expression (8), f(i, j) indicates the pixel value at the coordinates (i, j) in the template image 204, and g(i, j) indicates the pixel value in the area that is to be subjected to correlation value calculation in the search image 205. The area that is to be subjected to correlation value calculation has the same size as the template image 204. Then, for each pixel in the two blocks, the absolute value of the difference between the pixel values f(i, j) and g(i, j) is calculated, and the sum of the differences is obtained, thus obtaining a correlation value S_SAD. Accordingly, the smaller the correlation value S_SAD is, the smaller the difference in luminance value is between the two blocks, that is to say, the greater the resemblance is between the textures in the template image 204 and the area for which the correlation value was calculated.

Note that although the example of using a SAD for the correlation value is described in the present embodiment, the present invention is not limited in this way, and it is possible to use another correlation value such as a sum of square differences (SSD) or a normalized cross correlation (NCC).

Then the position (MVX, MVY) having the smallest correlation value is output as the motion vector value for each of the grid blocks 202, and the moving amount between the two consecutive frame images is obtained based on the motion vector values that were obtained for the grid blocks 202. At this time, the average value of the motion vector values for the grid blocks 202 may be used as the moving amount, or a statistically obtained value such as a median value may be used, for example, and the present invention is not limited by the method for obtaining the moving amount.

According to the first embodiment described above, it is possible to reduce the data amount of the vector detection images that are written to the memory 104, and it is possible to complete vector detection processing more quickly.

Note that in the first embodiment described above, whether a feature point or the central point is to be used is determined based on whether or not the grid block is a grid block at the lower edge. However, the present invention is not limited in this way, and whether a feature point or the central point is to be used may be determined based on whether or not the grid block is a grid block at the upper edge. In this case, there is no need to perform vector detection image generation processing for image signals from the extra-grid areas 206 above the image 201, and similar effects can be obtained.

Second Embodiment

Next, a second embodiment of the present invention will be described. In the second embodiment, control performed by the memory address generation unit 106 is different from that in the first embodiment. Other configurations are similar to those in the first embodiment, and therefore the following description focuses on only the differences.

Figure 9:
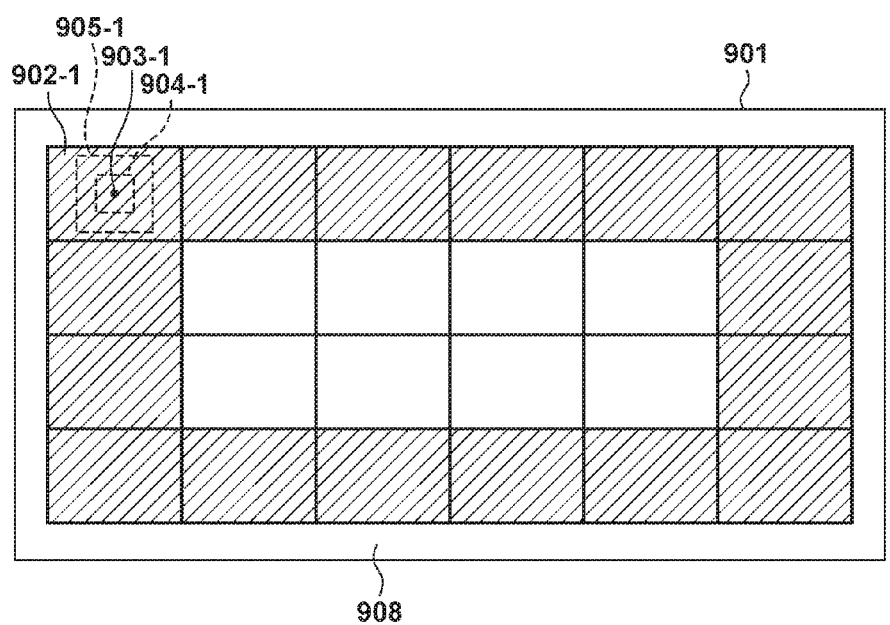
FIG. 9 is a diagram showing an example of image division according to a second embodiment.

FIG. 9 is a diagram showing an example in which an image is divided into grid blocks in the second embodiment, and in this figure, an image 901 is divided into six portions horizontally and four portions vertically to obtain a total of 24 grid blocks 902. In the subsequent processing, a representative point 903 (a feature point or the center point in the first embodiment) is obtained for each of the grid blocks 902, the positions of a template image 904 and a search image 205 are determined according to the obtained representative point 903, and then template matching is performed. It should be noted that unlike the first embodiment, vector detection image generation processing is not performed for extra-grid areas 908, and corresponding images are not written to the memory 104.

The following describes the determination of readout positions for the template image 204 and the search image 205 by the memory address generation unit 106 of the second embodiment. In the second embodiment, control differs between (a) the case where the grid block targeted for vector detection is not at an edge and (b) the case where the grid block targeted for vector detection is at an edge. Note that information indicating whether or not the grid block targeted for vector detection is at an edge is determined based on grid block coordinate information that is input from the grid dividing unit 101 to the memory address generation unit 106.

Note that the control performed in (a) the case where the grid block targeted for vector detection is not at an edge is the same as the control performed in "(a) the case where the grid block targeted for vector detection is not at the lower edge" in the first embodiment described above, with the exception that image signals from the extra-grid areas 206 are not processed, and therefore a redundant description will not be given for this case.

(b) Case where Grid Block Targeted for Vector Detection is at Edge

In an edge grid block 902-1 (and the hatched grid blocks in FIG. 9), the feature point (PX, PY) in the grid block is not used, similarly to "(b) the case where the grid block targeted for vector detection is at the lower edge" in the first embodiment. Control is performed such that the center of the template image 904 is placed at the center point (DX, DY) of the grid block.

Accordingly, in the second embodiment, in the case of performing template matching processing on an edge grid block, extra-grid areas are not needed, and therefore there is no need to perform vector detection image generation processing for image signals from grid blocks outside the edge grid block and write corresponding images to the memory 104.

Note that in the second embodiment, control is performed such that the template image 904 is placed at the center position of the grid block 902 in the case of an edge grid block. However, the present invention is not limited in this way, and control may be performed such that the center of the template image 904 is placed at a fixed point at which neither the template image 904 nor the search image 905 protrude from the grid block 902 (i.e., both are completely contained within the divided area). In this case, the fixed point may be a point at which neither of the images protrude upward when the grid block is at the upper edge, downward when the grid block is at the lower edge, leftward when the grid block is at the left edge, and rightward when the grid block is at the right edge.

According to the second embodiment described above, it is possible to obtain effects similar to those of the first embodiment, and also further reduce the data amount of the vector detection images that are written to the memory 104.

Third Embodiment

Next, a third embodiment of the present invention will be described. In the third embodiment, the configuration of the memory address generation unit 106 is different from that in the first embodiment. Other configurations are similar to those in the first embodiment, and therefore the following description focuses on only the differences.

Figure 10:
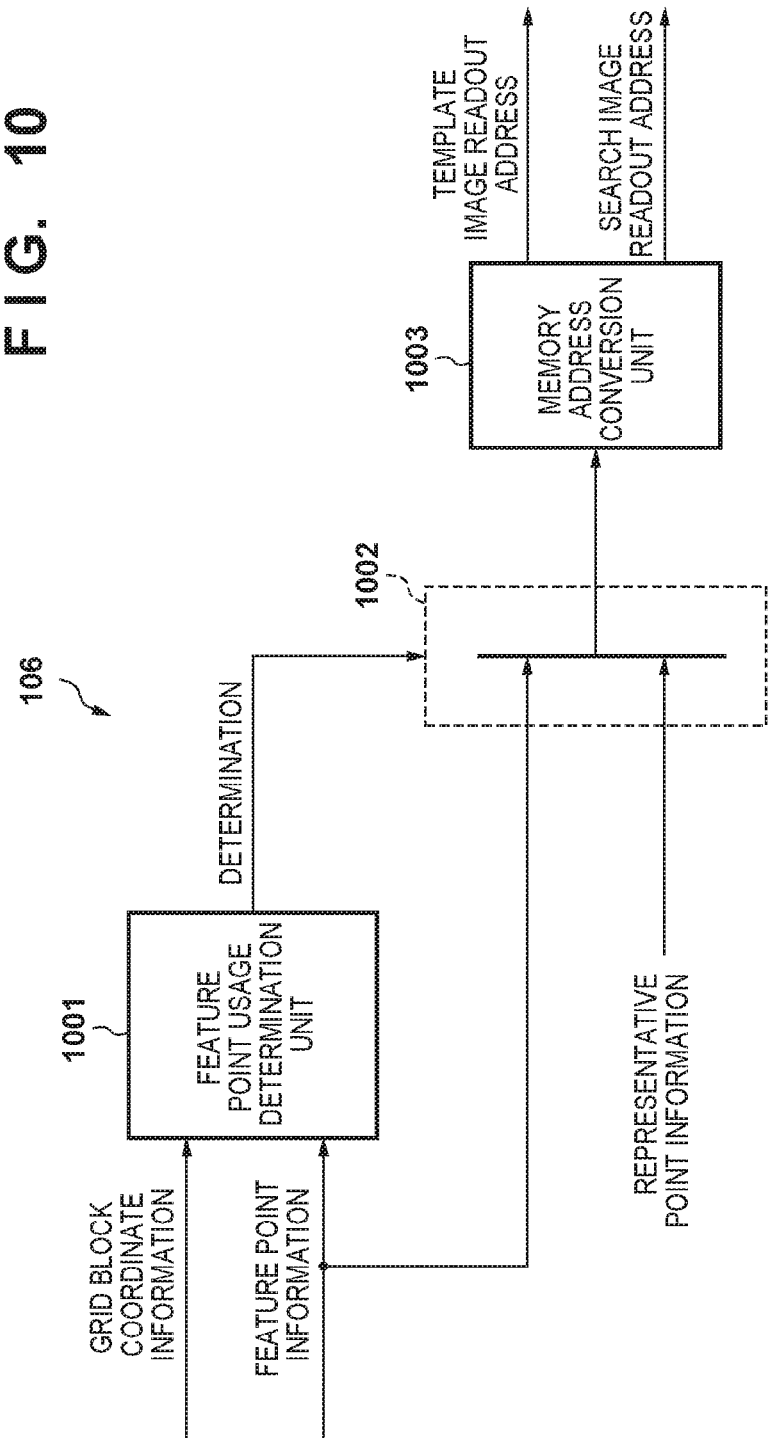
FIG. 10 is a block diagram showing a configuration of a memory address generation unit according to a third embodiment.

FIG. 10 is a block diagram showing the configuration of the memory address generation unit 106 according to the third embodiment. In FIG. 10, a feature point usage determination unit 1001 determines whether or not the feature point coordinates are to be used based on feature point information and grid block coordinate information. A selector 1002 switches between setting the feature point coordinates (PX, PY) or the grid block center coordinates (DX, DY) as the coordinates that are to be input to a memory address conversion unit 1003 (referred to hereinafter as the "representative point"), based on the determination result from the feature point usage determination unit 1001. The memory address conversion unit 1003 generates a template image readout address and a search image readout address based on the coordinate information from the selector 1002. Note that the processing performed by the memory address conversion unit 1003 is similar to processing in the first embodiment, and therefore a redundant description will not be given for this.

Figure 11:
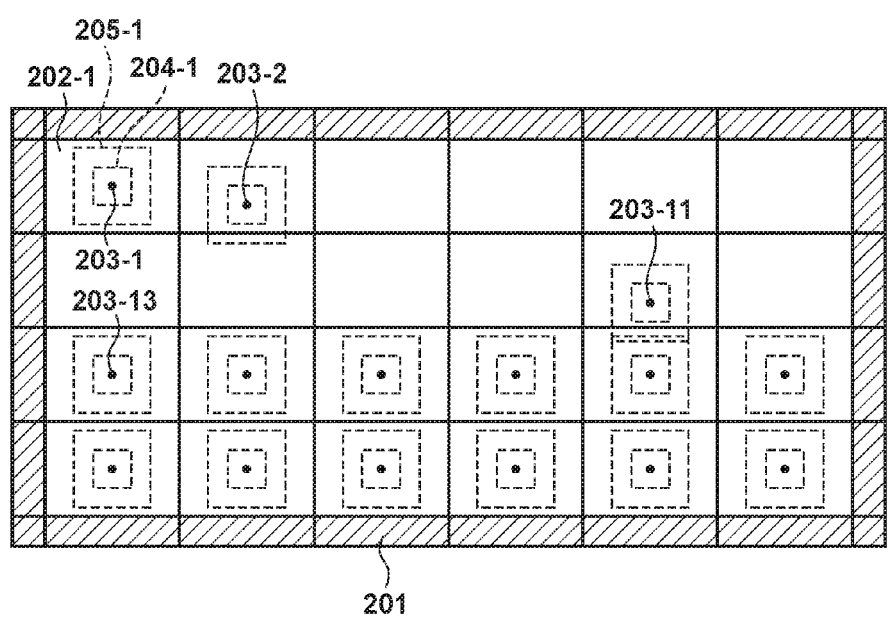
FIG. 11 is a conceptual diagram showing motion vector detection processing according to the third embodiment.
Figure 12:
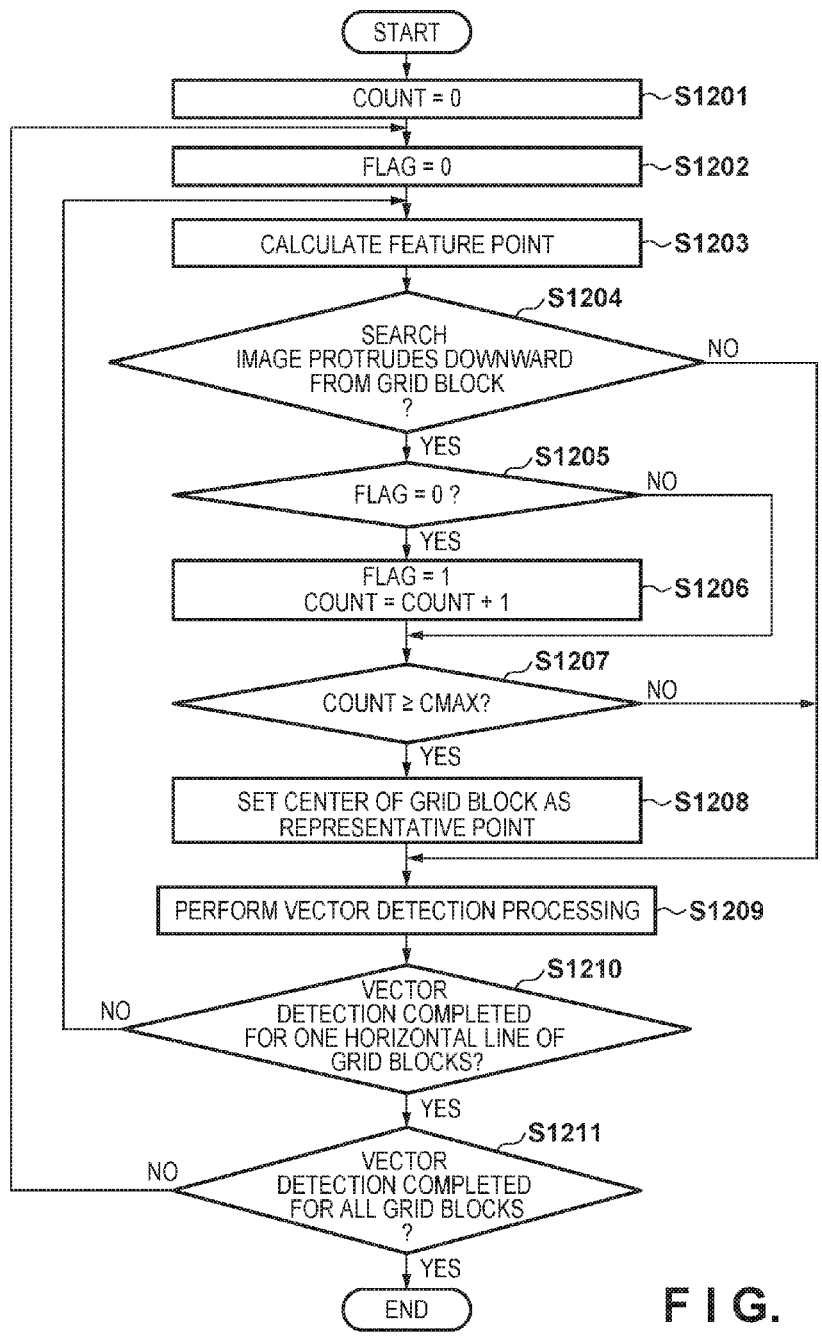
FIG. 12 is a flowchart showing motion vector detection processing according to the third embodiment.
Figure 13:
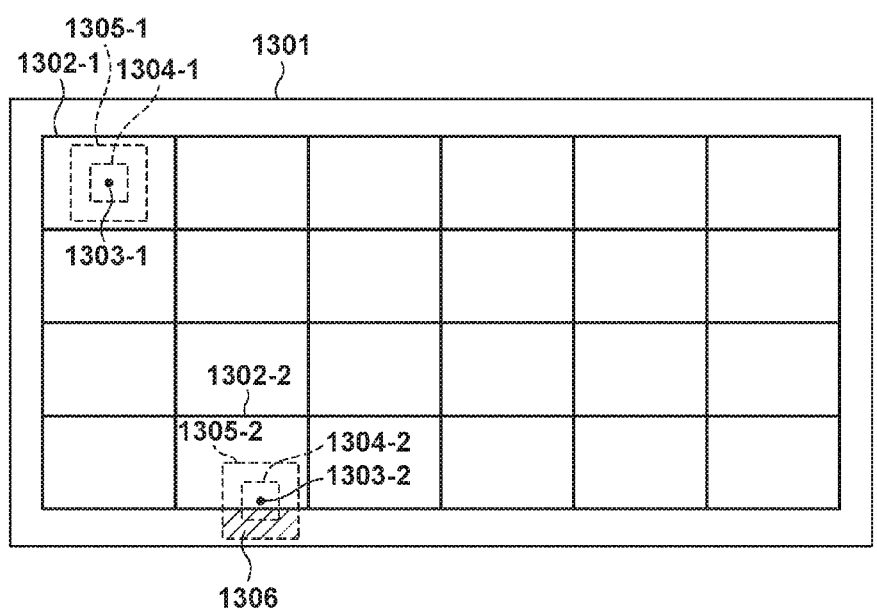
FIG. 13 is a diagram for describing conventional template matching processing that uses grid division and feature points.

FIG. 11 conceptually shows vector detection processing performed using a representative point in the third embodiment, and FIG. 12 is a flowchart of this vector detection processing. The following describes vector detection processing in the third embodiment with reference to FIGS. 11 and 12. Note that in FIG. 11, elements similar to those in FIG. 2 are denoted by the same reference signs, and descriptions will not be given for them.

First, in step S1201, a variable COUNT is initialized. The variable COUNT indicates the number of times that the search image for a grid block 202 protrudes downward from the grid block when the feature point 203-2 is used as the representative point.

Next, in step S1202, a variable FLAG is initialized. The variable FLAG is a flag for performing control such that the variable COUNT is incremented a maximum of one time in each horizontal line of grid blocks. If the search image protrudes downward from the grid block 202 of interest even one time in a horizontal line of grid blocks, vector detection processing cannot be started until the completion of vector detection image generation processing for grid blocks 202 therebelow. For this reason, the variable COUNT needs only be incremented one time in a horizontal line of grid blocks.

In step S1203, the feature point calculation unit 103 calculates a feature point for the grid block 202 of interest. In subsequent step S1204, the feature point usage determination unit 1001 determines whether or not a search image centered on the feature point in the grid block of interest calculated by the feature point calculation unit 103 protrudes downward from the grid block 202 of interest. Let (GSX, GSY) be the upper left coordinates of the grid block, (GEX, GEY) be the lower right coordinates, (GPX, GPY) be the feature point coordinates, TY be the vertical size of the template image 204, and SY be the vertical size of the search image 205. If the condition of Determination Expression (9) below is satisfied, the search image protrudes downward from the grid block 202 of interest.

$$GEY < GPY + SY/2 \tag{9}$$

In S1205, if the variable FLAG is 0, the feature point usage determination unit 1001 moves to step S1206, whereas if the variable FLAG is 1, the Determination Expression (9) described in step S1204 has already been satisfied in the grid block line of interest, and therefore step S1206 is skipped, and the procedure moves to step S1207. In step S1206, the feature point usage determination unit 1001 sets the variable FLAG to 1, increments the variable COUNT by 1, and then moves to step S1207.

Next, in step S1207, the feature point usage determination unit 1001 determines whether or not the variable COUNT exceeds a threshold value CMAX. The threshold value CMAX is determined according to the detection performance (particularly, the detection speed) in vector detection processing for one frame, for example.

As described above, in vector detection processing that employs a feature point, if the search image 205 protrudes downward, template matching processing cannot be started unless vector detection image generation processing has been performed on the grid block 202 that is below the grid block of interest. For this reason, the processing speed decreases.

In view of this, in step S1208, if the variable COUNT exceeds the threshold value CMAX, control is performed such that the feature point usage determination unit 1001 outputs 1 and the selector 1002 can select the center point information. Accordingly, template matching processing is switched to processing that employs the center point in grid blocks that are in the rows after the row in which the threshold value was exceeded (i.e., in the grid blocks from the grid block 202-13 onward in FIG. 11). By using the center point as the representative point in this way, template matching processing can be started without waiting for vector detection image generation processing to be completed for grid blocks at a lower position, thus making it possible to increase the speed of processing. Note that if the condition of step S1207 is not satisfied, step S1208 is skipped.

In step S1209, vector detection processing is performed. Specifically, based on the input coordinate information, the memory address generation unit 106 generates a readout address for the template image 204 and a readout address for the search image 205, and the matching processing unit 105 performs template matching processing. Accordingly, vector data is calculated for the grid block of interest.

In step S1210, if processing has not been completed for one horizontal line of grid blocks, the procedure moves to step S1203. If processing has been completed for one horizontal line of grid blocks, the procedure moves to step S1211.

In step S1211, if vector detection processing has not been completed for all of the grid blocks, the procedure moves to step S1202, and the variable FLAG is reset. If vector detection processing has been completed for all of the grid blocks, vector detection processing is ended.

According to the third embodiment described above, it is possible to realize vector detection processing that employs a feature point with consideration given to the detection performance of the vector detection processing on an input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-197965, filed on Oct. 5, 2015 which is hereby incorporated by reference herein in its entirety.

What is claimed is:

1. An image processing apparatus comprising:
 a dividing unit that divides each of two frame images into a plurality of divided areas;
 a determination unit that determines a representative point for each of the divided areas in one frame image out of the two frame images;
 a setting unit that, for each of the two frame images, sets image portions for detecting movement between the two frame images, based on the representative points; and
 a detection unit that detects movement between the two frame images based on correlation values of image signals in the set image portions in the two frame images,
 wherein for each of the divided areas, the determination unit determines a feature point of the divided area or a predetermined fixed point as the representative point of the divided area in accordance with a position of the divided area in the one frame image.

2. The image processing apparatus according to claim 1, wherein the determination unit determines the fixed point as the representative point if the divided area is at a lower edge of the frame image.

3. The image processing apparatus according to claim 2, wherein the fixed point is at a position at which the image portion does not protrude downward from the divided area in a case where the divided area is at the lower edge of the frame image.

4. The image processing apparatus according to claim 1, wherein the determination unit determines the fixed point as the representative point if the divided area is at an upper edge of the frame image.

5. The image processing apparatus according to claim 4, wherein the fixed point is at a position at which the image portion does not protrude upward from the divided area in a case where the divided area is at the upper edge of the frame image.

6. The image processing apparatus according to claim 1, wherein the determination unit determines the fixed point as the representative point if the divided area is at an edge of the frame image.

7. The image processing apparatus according to claim 6, wherein the fixed point is at a position at which the image portion does not protrude leftward from the divided area in a case where the divided area is at a left edge of the frame image.

8. The image processing apparatus according to claim 6, wherein the fixed point is at a position at which the image portion does not protrude rightward from the divided area in a case where the divided area is at a right edge of the frame image.

9. The image processing apparatus according to claim 1, wherein the fixed point is at a position at which the image portion is completely contained in the divided area.

10. The image processing apparatus according to claim 9, wherein the fixed point is a center point of the divided area.

11. The image processing apparatus according to claim 1, wherein letting the image portions set in the divided areas of another frame image out of the two frame images be first image portions, and letting the image portions set in the one frame image be second image portions, the setting unit sets the first image portions larger than the second image portions, and
the detection unit obtains a correlation value between an image signal in an image portion in the first image portion of the same size as the second image portion and an image signal in the second image portion, while shifting the image portion in the first image portion.

12. An image processing apparatus comprising:
a dividing unit that divides each of two frame images into a plurality of divided areas;
a determination unit that determines a representative point for each of the divided areas in one frame image out of the two frame images;
a setting unit that, for each of the two frame images, sets image portions for detecting movement between the two frame images, based on the representative points; and
a detection unit that detects movement between the two frame images based on correlation values of image signals in the set image portions in the two frame images,
wherein for each of the divided areas, the determination unit determines a feature point of the divided area or a predetermined fixed point as the representative point of the divided area in accordance with detection performance of the detection unit.

13. The image processing apparatus according to claim 12, wherein the detection performance of the detection unit is a correlation value detection speed.

14. The image processing apparatus according to claim 12, further comprising a counting unit that counts the number of divided area rows in which an image portion set based on a feature point protrudes downward from a divided area,
wherein if the counted number of divided area rows obtained by the counting unit exceeds a predetermined value that is determined based on the detection performance, the determination unit determines the fixed point as the representative point for the divided areas in the next and subsequent rows.

15. The image processing apparatus according to claim 12, wherein letting the image portions set in the divided areas of another frame image out of the two frame images be first image portions, and letting the image portions set in the one frame image be second image portions, the setting unit sets the first image portions larger than the second image portions, and
the detection unit obtains a correlation value between an image signal in an image portion in the first image portion of the same size as the second image portion and an image signal in the second image portion, while shifting the image portion in the first image portion.

16. An image processing method comprising:
dividing each of two frame images into a plurality of divided areas;
determining a representative point for each of the divided areas in one frame image out of the two frame images;
setting, for each of the two frame images, image portions for detecting movement between the two frame images, based on the representative points; and
detecting movement between the two frame images based on correlation values of image signals in the set image portions in the two frame images,
wherein in the determining, for each of the divided areas, a feature point of the divided area or a predetermined fixed point is determined as the representative point of the divided area in accordance with a position of the divided area in the one frame image.

17. An image processing method comprising:
dividing each of two frame images into a plurality of divided areas;
determining a representative point for each of the divided areas in one frame image out of the two frame images;
setting, for each of the two frame images, image portions for detecting movement between the two frame images, based on the representative points; and
detecting movement between the two frame images based on correlation values of image signals in the set image portions in the two frame images,
wherein in the determining, for each of the divided areas, a feature point of the divided area or a predetermined fixed point is determined as the representative point of the divided area in accordance with detection performance of the detection unit.

18. A non-transitory computer-readable storage medium storing a program for causing a computer to function as the units of the image processing apparatus that comprises:
a dividing unit that divides each of two frame images into a plurality of divided areas;
a determination unit that determines a representative point for each of the divided areas in one frame image out of the two frame images;
a setting unit that, for each of the two frame images, sets image portions for detecting movement between the two frame images, based on the representative points; and
a detection unit that detects movement between the two frame images based on correlation values of image signals in the set image portions in the two frame images,
wherein for each of the divided areas, the determination unit determines a feature point of the divided area or a predetermined fixed point as the representative point of the divided area in accordance with a position of the divided area in the one frame image.

19. A non-transitory computer-readable storage medium storing a program for causing a computer to function as the units of the image processing apparatus that comprises:
a dividing unit that divides each of two frame images into a plurality of divided areas;

a determination unit that determines a representative point for each of the divided areas in one frame image out of the two frame images;

a setting unit that, for each of the two frame images, sets image portions for detecting movement between the two frame images, based on the representative points; and a detection unit that detects movement between the two frame images based on correlation values of image signals in the set image portions in the two frame images, wherein for each of the divided areas, the determination unit determines a feature point of the divided area or a predetermined fixed point as the representative point of the divided area in accordance with detection performance of the detection unit.

* * * * *